United States Patent [19]

Tu

[11] Patent Number: 5,336,401
[45] Date of Patent: Aug. 9, 1994

[54] WATER FILTRATION AND AERATION SYSTEM FOR AQUARIUMS

[76] Inventor: Chih - Yao Tu, Fl. 3, No. 241, Sec. 1, Ta-an Road, Taipei, Taiwan

[21] Appl. No.: 61,015

[22] Filed: May 14, 1993

[51] Int. Cl.$^5$ ............................................. A01K 63/04
[52] U.S. Cl. ...................... 210/169; 210/220; 210/416.2; 119/261; 261/93; 261/123
[58] Field of Search .............. 210/169, 220, 416.2, 210/150, 151; 119/5, 259, 260, 261; 261/DIG. 75, 84, 93, 123

[56] References Cited

U.S. PATENT DOCUMENTS

| | | | |
|---|---|---|---|
| 2,137,397 | 11/1938 | Haldeman | 119/5 |
| 2,275,428 | 3/1942 | Haldeman | 119/5 |
| 2,515,538 | 7/1950 | Wall | 119/5 |
| 3,273,717 | 9/1966 | Canterbury | 119/5 |
| 3,295,681 | 1/1967 | Rubert et al. | 210/169 |
| 3,891,555 | 6/1975 | Bennett et al. | 210/169 |
| 4,944,871 | 7/1990 | Ogawa | 210/169 |
| 5,006,238 | 4/1991 | Tominaga | 210/169 |
| 5,011,600 | 4/1991 | Mowka et al. | 210/169 |
| 5,092,991 | 3/1992 | Ogawa | 119/5 |
| 5,131,821 | 7/1992 | Marioni et al. | 210/169 |

Primary Examiner—Peter A. Hruskoci
Assistant Examiner—Robert James Popovics
Attorney, Agent, or Firm—Browdy and Neimark

[57] ABSTRACT

A water filtration and aeration system fastened to an aquarium to let gas ($CO_2$, $O_2$) be admitted in minute bubbles into water and then to let treated water be guided back to the aquarium. The system includes a gas diffusing unit, a flow guide assembly connected to the gas diffusing unit by a coupler, and an extension cylinder coupled to the flow guide assembly at the bottom. Gas and aquarium water are guided downwards to a mixing chamber in the coupler where they are mixed by a motor-driven vane, then treated water is guided by the flow guide assembly to flow out of the extension cylinder to the aquarium again.

4 Claims, 2 Drawing Sheets

WATER FILTRATION AND AERATION SYSTEM FOR AQUARIUMS

BACKGROUND OF THE INVENTION

The present invention relates to a water filtration system which can be conveniently fastened to an aquarium and controlled to let gas be admitted in minute bubbles into water and then to let treated water flow downwards to the aquarium again.

Various water filtration and aeration systems are known, and widely used in aquariums. These water filtration and aeration systems are commonly fastened to the bottom of the aquarium for letting gas be admitted in minute bubbles into water. As gas is released upwards, it escapes out of water rapidly. Therefore, much gas is wasted.

SUMMARY OF THE INVENTION

The present invention eliminates the aforesaid problem. The primary object of the present invention is to provide a water filtration and aeration system for an aquarium which has a mixing chamber at which gas is admitted in minute bubbles into rarer and then treated water is guided downwards to the aquarium. It is another object of the present invention to provide a filtration and aeration system which collects escaped gas for letting it be admitted in minute bubbles into water again.

DETAILED DESCRIPTION OF THE PREFERRED EMBODIMENT

Figure 4:
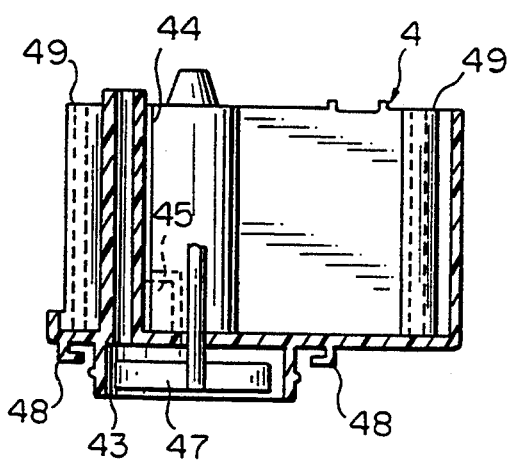
FIG. 4 is a cross sectional view of the gas diffusing unit of the system shown in FIG. 2.

Referring to the annexed drawings in detail, a water filtration and aeration system according to the preferred embodiment of the present invention is generally comprised of a gas diffusing unit, a flow guide assembly connected to the gas diffusing unit by a coupler, and an extension cylinder coupled to the flow guide assembly at the bottom. The filtration and aeration system includes a top cover 1, a face panel 2, a filter cloth 3, a gas diffusing unit 4, a coupler 5. The gas diffusing unit 4 comprises a power supply unit (not shown, sealed on the inside) and a motor 41 fastened inside a casing 44 thereof, an intake pipe or gas passageway 42 at one side in a vertical position, a chamber 43 (see FIG. 4) at the bottom being in fluid communication with said intake pipe or has passageway 42 which extends through the height of the gas diffusing unit, two water inlets 45 communicated with the chamber 43, two parallel guide rays 46 bilaterally and vertically disposed on the casing 44 at two opposite sides relative to the water inlets 45, two spaced bottom retaining lugs 48 bilaterally disposed by the chamber 43, a vane 47 coupled to the output shaft of the motor 41 and disposed in the chamber 43 at the bottom, and four mounting tubes 49 respectively disposed at the four corners thereof.

The face panel 2 is made in a curved shape covered on the casing 44 of the gas diffusing unit 4 at one side, having two rails 21 engaged into the guide ways 46 on the gas diffusing unit 4, a shutter 22 controlled by an adjusting block 23 thereof to regulate the amount of intake water.

Figure 1:
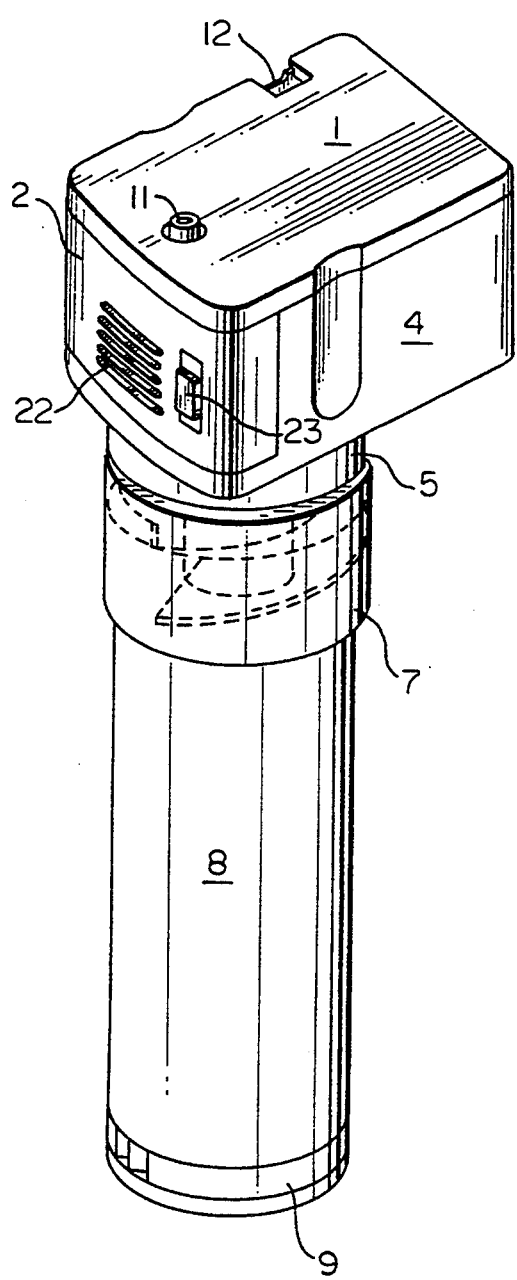
FIG. 1 is a perspective elevational view of a water filtration and aeration system according to the preferred embodiment of the present invention.
Figure 3:
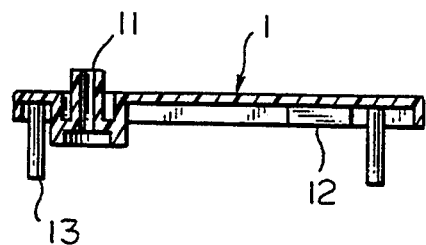
FIG. 3 is a cross sectional view of the top cover of the system shown in FIG. 2.

The top cover 1 covers on the gas diffusing unit 4 at the top, having four bottom pins 13 at the four corners thereof respectively fitted into the mounting tubes 49 on the gas diffusing unit 4, an air intake port 11 at the top coupled to the intake pipe 42 of the gas diffusing unit 4 (see FIG. 3), and a hole 12 near a rear end thereof for passing electric wires.

Figure 5:
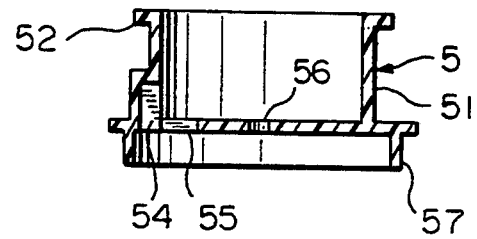
FIG. 5 is a cross sectional view of the coupler of the system shown in FIG. 2.

The coupler 5 comprises a mixing chamber 51 at the top in a relatively smaller outer diameter, two outward flanges 52 around the top edge of the mixing chamber 51 spaced by two gaps 53, through the gaps 53 the bottom retaining lugs 48 are inserted downwards and then turned sideways to engage with the outward flanges 52, a downward passage 54 on a broader base thereof communicated with a through hole 55 through the mixing chamber 51 (see FIG. 5), a center hole 56, and a bottom ring 57 surrounding the downward passage 54 and the through hole 55.

Figure 6:
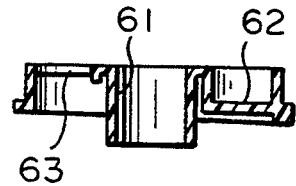
FIG. 6 is a cross sectional view of the upper flow guide of the system shown in FIG. 2.
Figure 2:
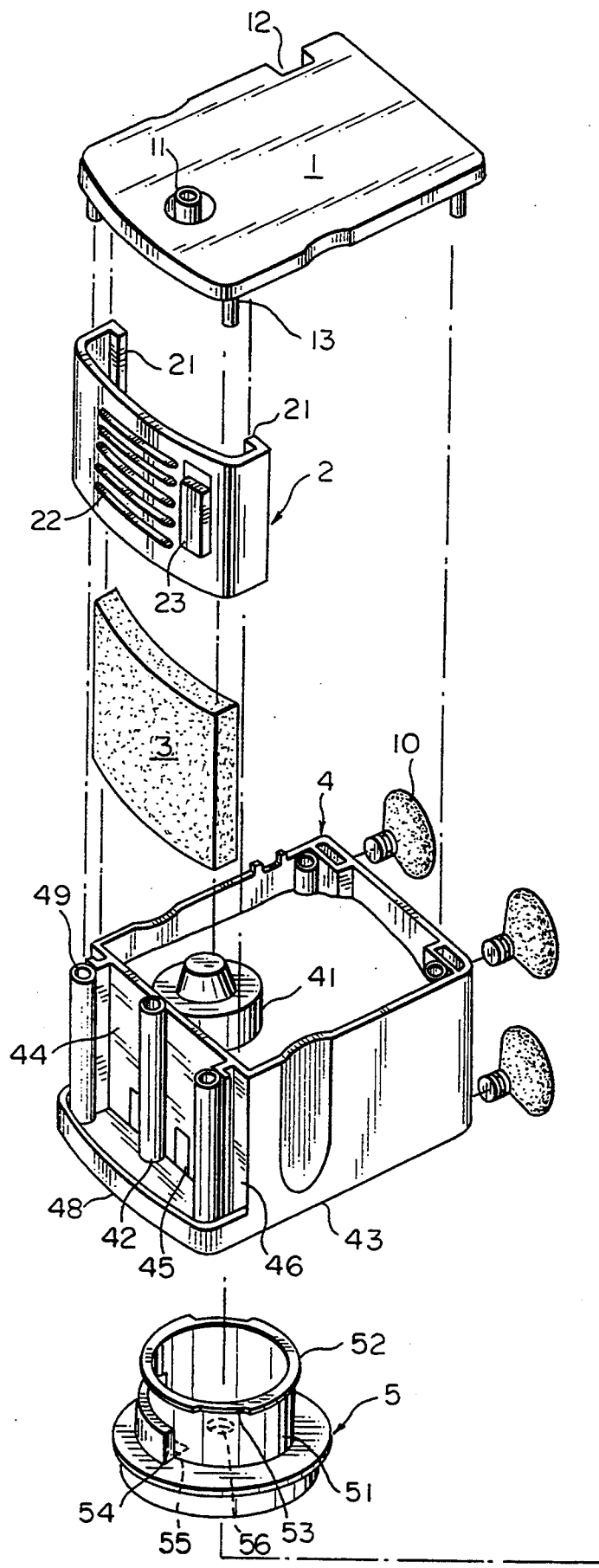
FIG. 2 is a perspective exploded view of the system shown in FIG. 1.
Figure 2:
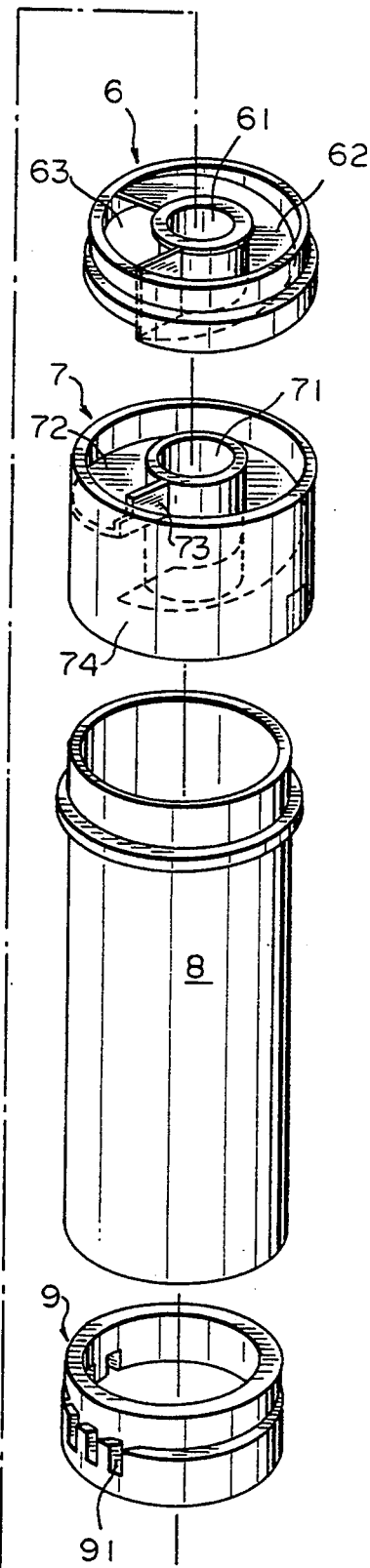

A flow guide assembly include a upper flow guide 6 and a lover Flow guide 7. The upper flow guide 6 fits into the bottom ring 57 of the coupler 5 (see FIG. 6), comprising a center tube 61, a through hole 63 in line with the passage 54 and through hole 55 on the coupler 5, a ramp way 62 which spirals around the center tube 61.

The lower flow guide 7 receives the upper flow guide 6, comprising a center tube 71, which receives the center tube 61 of the upper flow guide 6, a spiral ramp 72 around the center tube 71, a partition board 73 connected between the center tube 71 and the topmost end of the spiral ramp 72 to form a starting end below the through hole 63 on the upper flow guide 6 for guiding water out of the bottom outlet 74 of the spiral ramp 72.

The extension cylinder 8 having a top end fitted into the lower flow guide 7 at the bottom.

The bottom cap 9 covers on the extension cylinder at the bottom, having a plurality of water outlets 91 for drawing off water.

When assembled, the gas diffusing unit 4 is fastened to the glass wall of a glass aquarium on the inside by vacuum mounts 10. When operated, a flow of gas ($CO_2$ or $O_2$) is delivered to the gas diffusing unit 4 via the intake port 11, and the vane 47 is rotated by the motor 41 to pump water to the mixing chamber 51 for permitting intake gas to be admitted in minute bubbles into intake water. Well treated water is then guided through the through hole 55, the passage 54, the through hole 63, the spiral way 72, the outlet port 74 into the extension cylinder and then guided out of the bottom cap 9 through the water outlets 91 to the aquarium again. Escaped gas within the extension cylinder 8 is guided through the center tube 71 of the lower flow guide 7, the center tube 61 of the upper flow guide 6 and the center hole 51 on the connecting member 5 into the mixing chamber 51 for being admitted in minute bubbles into water again.

What is claimed is:

1. A water filtration and aeration system comprising a gas diffusing unit fastened inside an aquarium, a coupler connected to said gas diffusing unit at a bottom thereof, a flow guide assembly connected to said coupler at a bottom thereof, an extension cylinder having a top end connected to said flow guide assembly and a bottom end covered with a bottom cover and dipped in water contained in said aquarium, wherein water from said aquarium is guided through a filter pad to a mixing chamber defined within said coupler and stirred by a motor-driven vane to mix with gas delivered from a gas supply through a gas passageway through said gas diffusing unit, wherein treated from the gas diffusing unit is guided down within said flow guide assembly through said extension cylinder to outlet holes on said bottom cap back into said aquarium, wherein the gas diffusing unit includes a top cover, a face panel and said filter pad, said gas diffusing unit having an intake pipe at one side in a vertical position, a chamber at a bottom having being in fluid communication with said gas passageway which extends through a height of the gas diffusing unit, two water inlets in fluid communication with the chamber, and vertically disposed on a casing at two opposite sides relative to the water inlets, two spaced bottom retaining lugs bilaterally disposed by the chamber, a vane coupled to an output shaft of the motor and disposed in the chamber at the bottom.

2. The system according to claim 1, wherein the coupler comprises a mixing chamber at a top thereof, two outward flanges around a top edge of the mixing chamber spaced by two gaps, and a downward passage on a base thereof in fluid communication with a through hole through the mixing chamber, the base having a diameter greater than the diameter of the mixing chamber, a center hole, and a bottom ring surrounding the downward passage and the through hole.

3. The system according to claim 1, wherein the flow guide assembly includes an upper flow guide and a lower flow guide, wherein the upper flow guide fits into the bottom ring of the coupler, the upper flow guide comprising a center tube, a through hole in line with the passage and through hole on the coupler, and a ramp which spirals around the center tube to form a first spiral passage.

4. The system according to claim 3, wherein the lower flow guide receives the upper flow guide, the lower flow guide comprising a center tube, which receives the center tube of the upper flow guide, a ramp which spirals around the center tube to form a second spiral passage, a partition board connected between the center tube and the topmost end of the spiral wall to form a starting end below the through hole on the upper flow guide for guiding water out of a bottom outlet of the first spiral passage into a top inlet of the second spiral passage.

* * * * *